United States Patent
Wang Chen

(10) Patent No.: US 10,305,139 B2
(45) Date of Patent: May 28, 2019

(54) ENERGY STORAGE SYSTEM

(71) Applicant: High Tech Battery Inc., Sinyi District, Taipei (TW)

(72) Inventor: Kuei Yung Wang Chen, Taipei (TW)

(73) Assignee: HIGH TECH BATTERY INC., Sinyi District, Taipei (TW)

( * ) Notice: Subject to any disclaimer, the term of this patent is extended or adjusted under 35 U.S.C. 154(b) by 0 days.

(21) Appl. No.: 16/110,044

(22) Filed: Aug. 23, 2018

(65) Prior Publication Data

US 2018/0366763 A1 Dec. 20, 2018

Related U.S. Application Data

(63) Continuation of application No. 16/047,099, filed on Jul. 27, 2018.

(51) Int. Cl.
| | |
|---|---|
| H01M 2/16 | (2006.01) |
| H01M 4/02 | (2006.01) |
| H01M 4/505 | (2010.01) |
| H01M 10/04 | (2006.01) |
| H01M 4/66 | (2006.01) |
| H01M 10/48 | (2006.01) |
| H01M 10/056 | (2010.01) |
| H01M 10/054 | (2010.01) |
| H01M 4/133 | (2010.01) |

(52) U.S. Cl.
CPC ......... *H01M 10/056* (2013.01); *H01M 2/162* (2013.01); *H01M 4/133* (2013.01); *H01M 4/505* (2013.01); *H01M 4/661* (2013.01); *H01M 10/04* (2013.01); *H01M 10/054* (2013.01); *H01M 10/48* (2013.01); *H01M 2004/027* (2013.01); *H01M 2004/028* (2013.01); *H01M 2300/0045* (2013.01)

(58) Field of Classification Search
CPC ................. H01M 10/04; H01M 10/48; H01M 2004/027; H01M 2004/028; H01M 2300/0045; H01M 2/162; H01M 4/505; H01M 4/661
See application file for complete search history.

(56) References Cited

U.S. PATENT DOCUMENTS 10,033,030 B1 * 7/2018 Vajo .................. H01M 4/131
2009/0162736 A1 6/2009 Valiance et al.
(Continued)

FOREIGN PATENT DOCUMENTS

CN 105977526 A 9/2016
DE 102016011260 A1 * 3/2017 .......... H01M 10/056

OTHER PUBLICATIONS

Lin, M.-C., et al., "An ultrafast rechargeable aluminium-ion battery", Nature, vol. 520, pp. 325-328, published Apr. 16, 2015. (Year: 2015).*

(Continued)

*Primary Examiner* — Sarah A. Slifka
*Assistant Examiner* — Lilia Nedialkova
(74) *Attorney, Agent, or Firm* — Leydig, Voit & Mayer

(57) ABSTRACT

A metal-ion energy storage system includes positive and negative electrodes, a separator located between the positive and negative electrodes, an electrolyte including a mixture of imidazole salt and a main metal halogen. The electrolyte includes an additive other than the main metal halogen.

9 Claims, 17 Drawing Sheets

(56) References Cited

U.S. PATENT DOCUMENTS

| | | | | |
|---|---|---|---|---|
| 2010/0183917 A1* | 7/2010 | Holzapfel | ........... | H01M 2/1666 |
| | | | | 429/207 |
| 2012/0082904 A1* | 4/2012 | Brown | ................ | H01M 4/463 |
| | | | | 429/338 |
| 2014/0134501 A1* | 5/2014 | Li | ...................... | H01M 10/052 |
| | | | | 429/339 |
| 2015/0056499 A1 | 2/2015 | Dai et al. | | |
| 2017/0338513 A1* | 11/2017 | Chiang | ................ | H01M 4/133 |

OTHER PUBLICATIONS

Goujon, N., et al. "The influence of water and metal salt on the transport and structural properties of 1-octyl-3-methylimidazolium chloride", Australian Journal of Chemistry, vol. 68, pp. 420-425, published Aug. 26, 2014. (Year: 2014).*

Machine translation of German Patent Document No. 102016011260, published Mar. 30, 2017 (Year: 2017).*

Wang, W. et al, "A new cathode material for super-valent battery based on aluminum ion intercalation and deintercalation", Nature Scientific Reports, vol. 3, 3383, published Nov. 29, 2013. (Year: 2013).*

European Patent Office, Extended European Search Report of Application No. 18 18 6185, dated Dec. 17, 2018.

* cited by examiner

| Additives | Pre-intercalation Voltage | Side Reaction | Solubility (ppm) | Price | Recommended operating voltage of battery systems / intercalation volatge of the main metal halogen (V) |
|---|---|---|---|---|---|
| SnCl2 | 0.5~0.6 V | No | 50000 | Acceptable | 1.0~2.45 |
| BiCl3 | 0.8~1.0 V | Yes | 50000 | expensive | 1.5~2.45 |
| GaCl3 | <0.5V | No | 50000 | expensive | 1.0~2.45 |
| ZnCl2 | <0.5V | No | 5000 | Acceptable | 1.0~2.45 |

Figure 6

| Additives | Amount | Optimal amount |
|---|---|---|
| SnCl$_2$ | <10000ppm | 500 ppm |
| BiCl$_3$ | <10000ppm | 1000 ppm |
| GaCl$_3$ | <10000ppm | 5000 ppm |
| ZnCl$_2$ | <5000ppm | 100 ppm |
| THF | 600ppm~50000ppm | 3000 ppm |
| DMAC | 1000ppm~50000ppm | 5000 ppm |
| YCl$_3$ | <5000ppm | 500 ppm |
| LaCl3 | <5000ppm | 500 ppm |

Figure 17

ENERGY STORAGE SYSTEM

The present invention relates to a battery for use as rechargeable energy storage, for example particularly, but not exclusively, an energy storage with enhanced electrochemical performance.

BACKGROUND OF THE INVENTION

Metal ion battery shapes the future of energy storage. There is a drive to develop smaller and lighter batteries with high energy density at relatively low costs. The specific capacity (mAh/g) of the metal ion battery is determined by the electrode, which relates to the amount of an electrode active material that can be reversibly intercalated/de-intercalated and the weight of the electrode active material.

Electrodes with layered structure usually forming on a current collector that undergo good intercalation and de-intercalation of ions in the charging and discharging process. The easiness of the access of ions contributes to the electrochemical performance of the battery. Also the stability of the electrode is of importance. Current collector must be electrochemically stable when in contact with the battery component during the potential operation windows of the electrode. Continue corrosion of current collector lead to increase the internal resistance of the battery, which causes the capacity decline. Corrosion of the current collector may cause short-circuit. This raises doubts about the safety of the battery.

The invention seeks to offer an improvement to the existing battery arrangement at a reasonable cost.

SUMMARY OF THE INVENTION

In a first aspect of the invention there is provided a metal-ion energy storage system comprising positive and negative electrodes, a separator is provide therebetween the positive and negative electrodes, an electrolyte formed from a mixture of imidazole salt and a main metal halogen, wherein the electrolyte further includes an additive other than the main metal halogen. Preferably, the positive electrode comprises a current collector and at least one active material. More preferably, the current collector is nickel and the active material is selected from a group consisting graphite, Mxene, $LiFePO_4$, $LiMnO_2$, $LiMn_2O_4$, $Li_3V_2(PO_4)_3$ and $Na_3V_2(PO_4)_3$. Yet more preferably, the separator is a porous membrane which is made from a material selected from a group consisting PTFE, PAN, glass fiber and PI. It is preferable that the main metal halogen comprises a metal halogen selected from a group consisting $AlCl_3$, LiCl, NaCl and $MgCl_2$. More preferably the main metal halogen is a combination of metal halogens selected from a group consisting $AlCl_3$, LiCl, NaCl and $MgCl_2$. In the preferred embodiment, the main metal halogen comprises $AlCl_3$ and the imidazole salt comprises EMIC, the molar ratio of $AlCl_3$/EMIC is 1.1~2.2.

Advantageously, the additive comprises at least one support metal halogen having an intercalation voltage smaller than that of the main metal halogen. More advantageously, the halogen in the main and support metal halogens is selected from a group consisting F, Cl, Br and I. Yet more preferably, the additive comprises a rare earth halogen. In the preferred embodiment, the additive comprises an organic solvent. Advantageously, the additive comprises a mixture of any two or more of the additive selected from a group consisting a support metal halogen, a rare earth halogen and an organic solvent. More advantageously, the support metal halogens are selected from a group consisting $SnCl_2$, $BiCl_3$, $ZnCl_2$ and $GaCl_3$. Yet more advantageously, the amount of $SnCl_2$, $BiCl_3$ or $GaCl_3$ used as an additive is at or below 10000 ppm respectively. Preferably, the amount of $ZnCl_2$ used as an additive is at or below 5000 ppm. More preferably, the rare earth halogen is selected from a group consisting $YCl_3$ and $LaCl_3$. Yet more preferably, the amount of $YCl_3$ used as an additive is at or below 5000 ppm. It is preferable that the amount of $LaCl_3$ used as an additive is at or below 5000 ppm. It is advantageous that the organic solvent is selected from a group consisting cyclic ether and alkyl amide. Preferably, the cyclic ether comprises THF. More preferably, the alkyl amide comprises Dimethylacetamide (DMAC). Yet more preferably, the amount of THF used as an additive is 600 ppm-50000 ppm. It is preferable that the amount of DMAC used as an additive is 1000 ppm-50000 ppm. Preferably, the negative electrode comprises Aluminum.

BRIEF DESCRIPTION OF DRAWINGS

The invention will now be more particularly described, by way of example only, with reference to the accompanying drawings, in which:

FIG. 6 is a table showing the pre-intercalation voltage, side reaction, solubility (ppm), price and a recommended operating voltage range (V) of respective support metal halogens in a $AlCl_3$/EMIC electrolyte;

FIG. 17 is a table showing the amount (ppm) and the optimal amount (ppm) of respective additives, including $SnCl_2$, $BiCl_3$, $GaCl_3$, $ZnCl_2$, THF, DMAC, $YCL_3$ and $LaCl_3$ to be introduced into the electrolyte of a battery.

DETAILED DESCRIPTION OF PREFERRED EMBODIMENT

Figure 1:
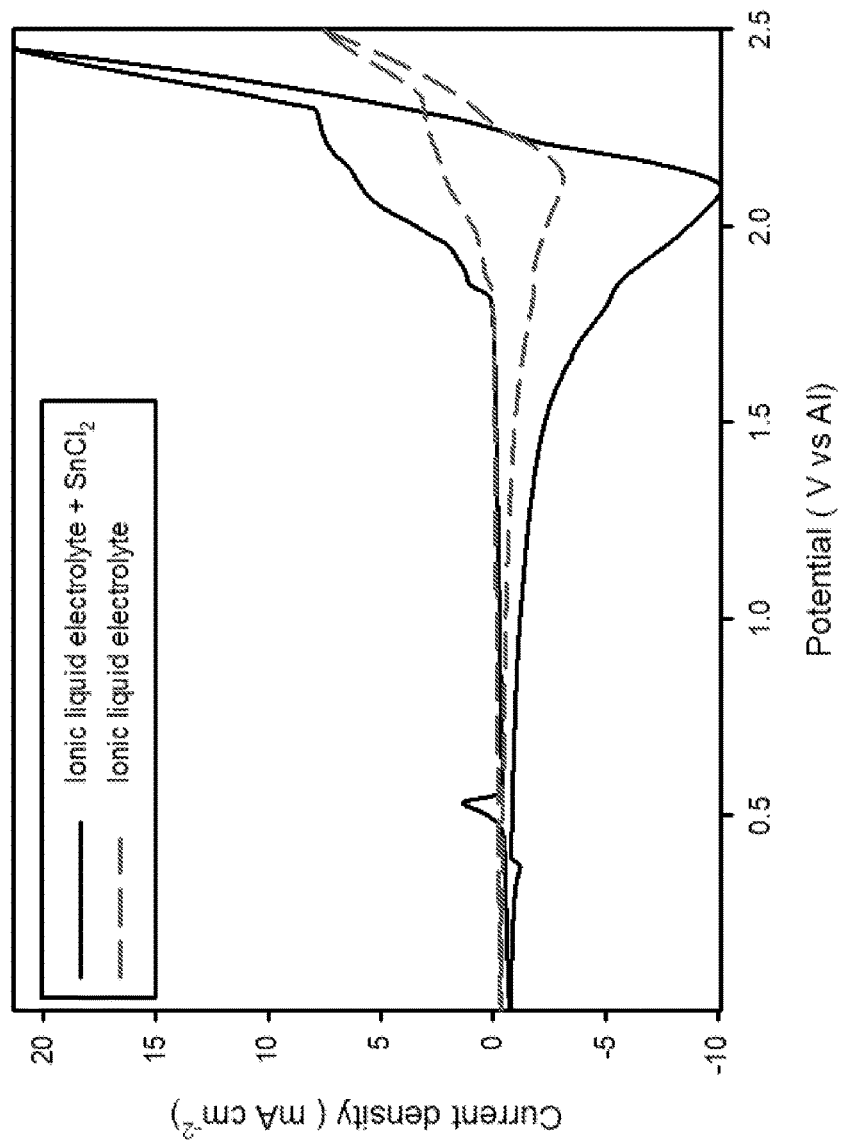
FIG. 1 is a Cyclic Voltammogram (CV) plot of a 3-electrode test showing influence on a pyrolytic graphite working electrode (analog battery positive electrode) when the electrolyte contains or does not contain Tim Chloride ($SnCl_2$) as an additive; the 3-electrode test only tests the positive electrode and is targeted at testing the electrical performance between positive electrode and an electrolyte.

The present invention is described in further details below referring to the preferred embodiments according to the present invention. It should be understood, however that the present invention is not to be construed as being limited thereto.

The invention involves the use of additive for improving the stability and efficiency of an energy storage device which comprises a metal ion battery.

More specifically, one or more additive is introduced into the electrolyte to improve the performance of the cathode (positive electrode) immersed therein and/or to neutralize any undesirable effect resulting from reaction of the base material which is preferably a current collector in the cathode with the material in the electrolyte.

In general, metal ion battery comprises a cathode, an anode, a separator provided therebetween and an electrolyte all contained in a sealed casing. The cathode is formed from a current collector and at least one active material. The active material, may be graphite, Mxene, $LiFePO_4$, $LiMnO_2$, $LiMn_2O_4$, $Li_3V_2(PO_4)_3$ and $Na_3V_2(PO_4)_3$, which is mixed with a solvent and an adhesive as well as conductive carbon powder to form paste. Layers of the paste are deposited on the current collector which is then allowed to dry thereby forming the cathode. The anode comprises metallic aluminum or metallic lithium. The separator comprises a porous material that prevents short circuit yet permitting passage of ion. The separator may be made from PTFE (polytetrafluoroethylene), PAN (polyacrylonitrile), glass fiber and/or PI (polyimide). The electrolyte is a low temperature molten salt, it may be formed from a mixture of imidazole salt and a main metal halogen(s). The imidazole salt is preferably an organic salt such as 1-methyl-3-ethylimidazolium chloride (EMIC). The metal halogen is preferably aluminum chloride ($AlCl_3$), sodium chloride (NaCl), lithium chloride (LiCl), and/or magnesium chloride ($MgCl_2$), The most preferred main metal halogen is $AlCl_3$. Alternatively, the main metal halogen is a combination of metal halogens selected from a group consisting $AlCl_3$, LiCl, NaCl and $MgCl_2$. The metal halogen may be a combination of metal chloride for example a combination of aluminum chloride and Lithium chloride or aluminum chloride and sodium chloride. The mole ratio of main metal halogen/EMIC is from 1.1 to 2.2 and preferably 1.3. The casing is to provide mechanical protection from external impact. The material used to form the casing must not react with any of the material stored therein.

Intercalation of the cathode is resulted from charging of the battery and de-intercalation of the cathode that occurs during the discharge of the battery. To shorten the time for charging the battery, the intercalation in the cathode is improved by way of pre-intercalation. Pre-intercalation is made possible by the intercalation of ion of a support/auxiliary metal halogen which maintains the interlayer distance between basal planes in the cathode. The presence of the support metal halogen ion prevents dramatic change in space between the basal planes, such that the main metal halogen ion can easily intercalate or de-intercalate between every cycle life.

In the ionic liquid electrolyte, there are at least two kinds of metal halogen, one being the main metal halogen for intercalation and the support metal halogen responsible for the pre-intercalation, which is introduce to the ionic liquid as an additive. The support metal halogen is a metal halogen different from the main metal halogen with different/respective intercalation voltages. The difference of the intercalation voltage is preferred to be at least 0.5V. More importantly, such support metal halogen should have an intercalation voltage lower than that of the main metal halogen and as such it must comprise of a metal halogen different from that of the support metal halogen.

The intercalation of the support metal halogen at the cathode occurs before the normal operation of the battery. As such it can be understood as pre-intercalation which take place at a relatively low voltage i.e. below the operational voltage which is attributable to the charging and discharging voltage of the battery. The operational voltage is the voltage of the battery required for intercalation and deintercalation of the main metal halogen. This would normally be within the range of 1.0-2.45V. In most circumstances the pre-intercalation voltage is at least 0.4V below the lower limit of the operational voltage. If the pre-intercalation voltage is too close to the lower limit of the operational voltage, pre-intercalation of support metal halogen and intercalation of main metal halogen may occur simultaneously which may bring about disintegration of electrode. For de-intercalation of the support metal halogen to occur, the voltage required should be lower than the voltage for pre-intercalation. This would ensure no unintended, accidental de-intercalation of the support metal halogen.

During normal operation of the battery, charging usually start to occur at about 1.0V and peaks at around 2.5V depending on nature and characteristics of the electrodes and electrolyte. Before operational charging of the battery, the pre-intercalation of the support metal halogen ion is completed. The support metal halogen ions are pre-intercalated to facilitate the access of the main metal halogen ions during the operational charging when the main metal halogen ions enter the cathode.

During normal operation of the battery, discharging occurs when the main halogen ion de-intercalate from the cathode. Each de-intercalated main metal halogen ion takes up more electrons and move towards the negative electrode.

The halogen in the main and support metal halogens is selected from a group consisting F, Cl, Br and I.

The possible candidates of support metal halogens are $SnCl_2$, $BiCl_3$, $GaCl_3$ and $ZnCl_2$.

This can be more easily explained with reference to FIGS. 1 and 2.

In FIG. 1, a three electrodes test Cycle Voltammetry (CV) plot is showed. The data of Cycle Voltammetry (CV) measurements is taken using Autolab PGSTAT 30 in a three electrode test system. It includes a pyrolytic graphite foil as a working electrode. The reference electrode and the counter electrode are aluminum foil. All of the electrodes were placed in a glass bottle with ionic liquid having a molar ratio $AlCl_3/EMIC=1.3$ in the glove box and sealed with a screw cap. Different curves are used to represent the measurements taken when the ionic liquid is with 500 ppm of $SnCl_2$ introduced as an additive and when the ionic liquid is without such additive. The scan rate is 10 mV/s.

FIG. 1 shows that the intercalation voltage of $SnCl_2$ is at 0.5V~0.6V. Under normal circumstances, intercalation of the ion of support metal halogen $SnCl_2$ occurs before the main metal halogen intercalation take place at 1.85V. The difference of the intercalation voltage between the support metal halogen and the main metal halogen is preferred to be at least 0.5 V. As such, it is known as pre-intercalation. The voltage at the cathode is maintained at 0.55V for 1-60 min to allow sufficient time for pre-intercalation to occur at cathode. Once completed, de-intercalation of the support metal halogen ion is unlikely as the normal operational voltage at the cathode will not go as low as below 0.5V to result in de-intercalation.

Figure 2:
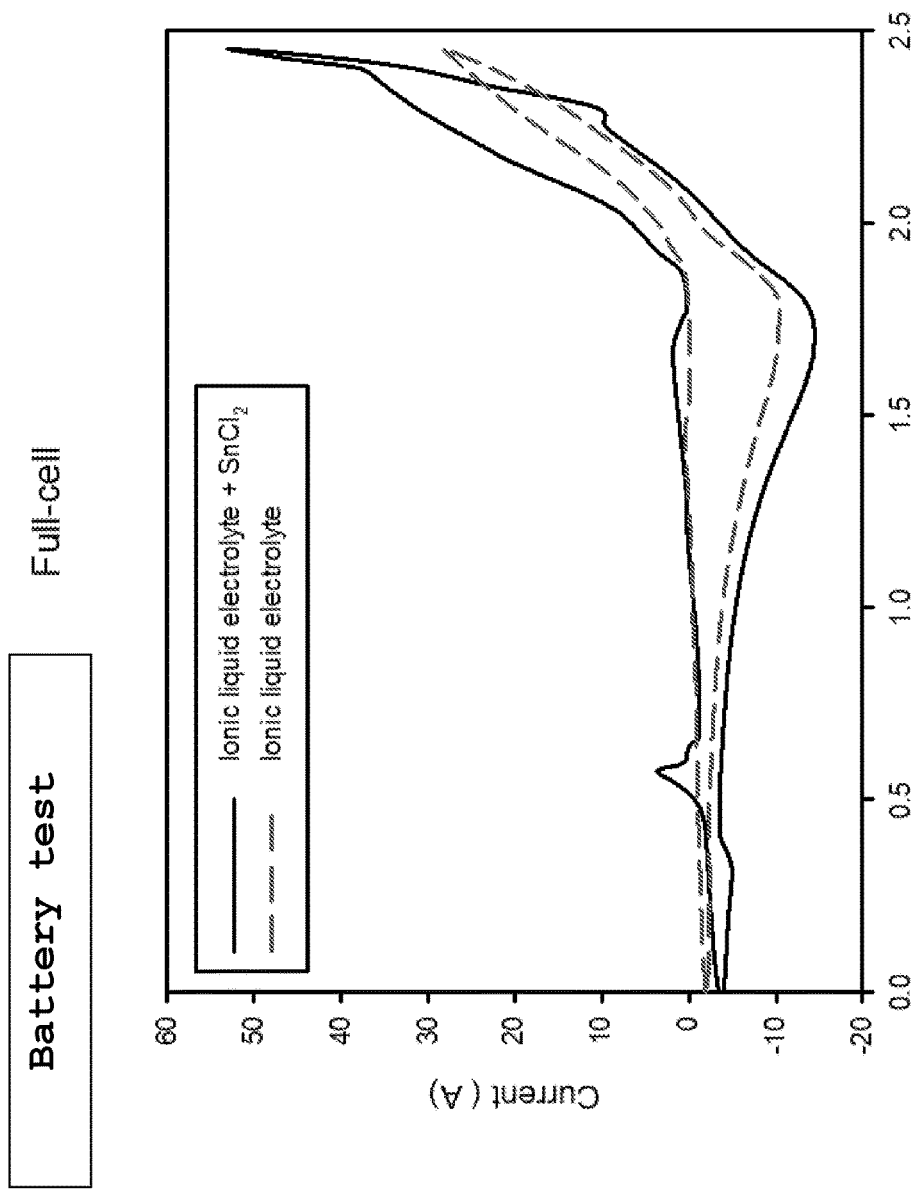
FIG. 2 is a CV plot of a battery test of a metal-ion battery with $SnCl_2$ additive after 8000 cycle.

In FIG. 2, the Battery test Cycle Voltammetry (CV) plot after 8000 cycle life test is showed. The cathode is a mixture comprising 93.5% graphite, 5% SBR, 1% VGCF, 1.5% CMC coated on a molybdenum foil. The anode is aluminum foil. A glass fiber membrane is provided between the electrodes as the separator. The size of the cathode and anode is about 3×3 cm. The electrolyte mixture comprises $AlCl_3$ as the main metal halogen and EMIC. The mole ratio of main metal halogen and 1-ethyl-3-methylimidazolium chloride is 1.3. The battery is assembled inside a well-controlled argon filled glove box with the electrolyte being filled. The support metal halogen is 500 ppm of $SnCl_2$ introduced into the electrolyte as an additive. The amount of $SnCl_2$ should be less than 10000 ppm.

Before Cycle life test (2.45V~1.0V), according to the basics of FIG. 1 two-stage charging is performed. In the first stage, Potentionstat charging is performed at 0.55V for no more than 1 hour. The second is Galvanoststic charging to 2.45V. After 8000 cycles of charge and discharge, it can be seen from the FIG. 2 that the battery can have a good reversibility.

Therefore during Potentionstat charging, pre-intercalation of the support metal halogen ion occurs. In this example, the support metal halogen is $SnCl_2$. To ensure that ions of $SnCl_2$ form the supporting material between the basal plane of the cathode, the Potentiostat charging time should be within 1 hour and can be as fast as 1 min. The lower the concentration of the additive, the lesser the time is required for the pre-intercalation. The amount of pre-intercalated support metal halogen can be manipulated by adjusting the concentration of the additive and the charging time.

The pre-intercalation of the support metal halogen ion allows the main metal halogen ion to easily intercalate or de-intercalate between every cycle life.

During Galvanostatic charging to 2.45V, intercalation of the main metal halogen ion $AlCl_4^-$ occurs at the cathode.

Figure 3:
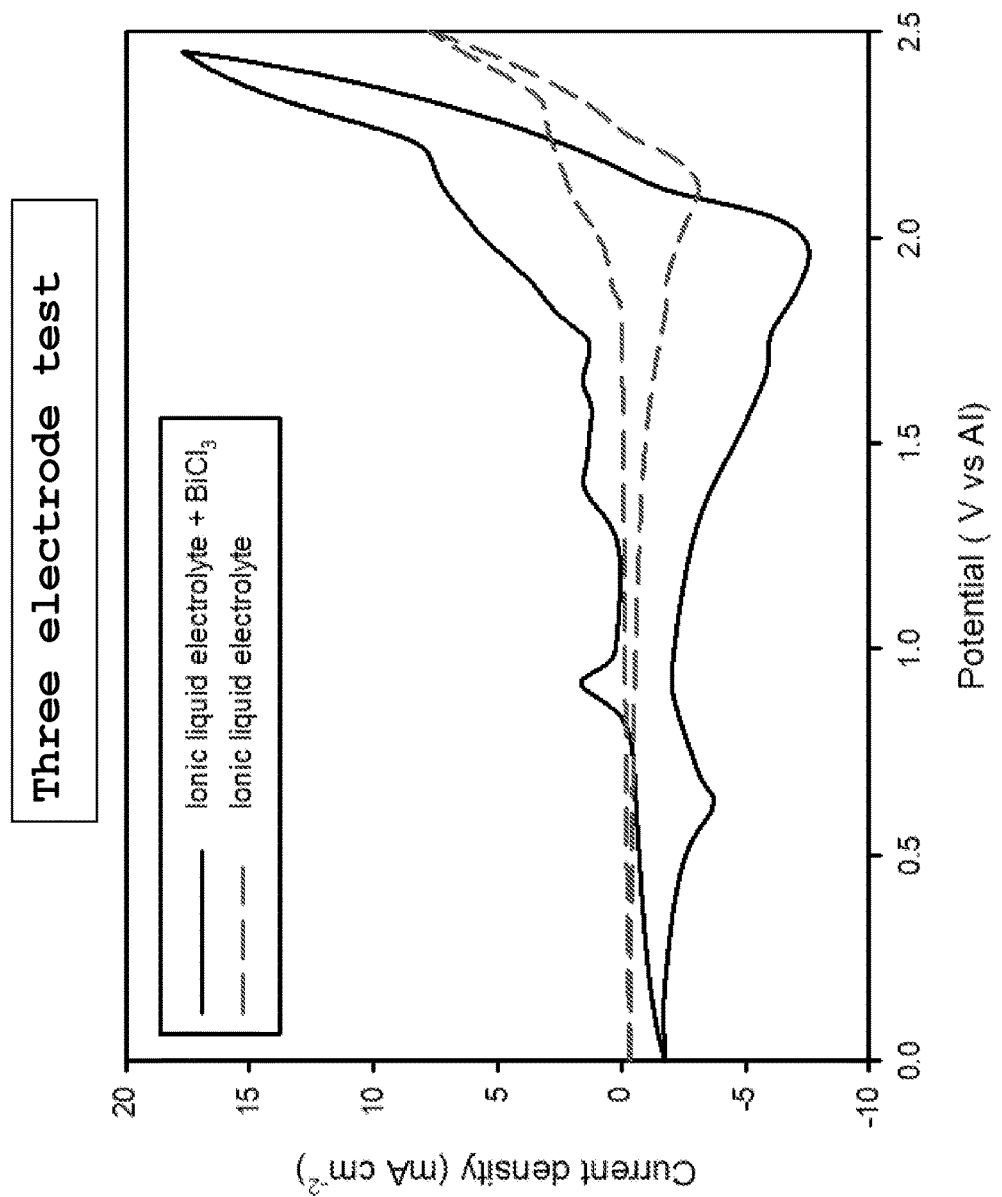
FIG. 3 is a CV plot of a three electrode test showing influence on a pyrolytic graphite working electrode when the electrolyte contains or does not contain Bismuth Chloride ($BiCl_3$) as an additive.
Figure 4:
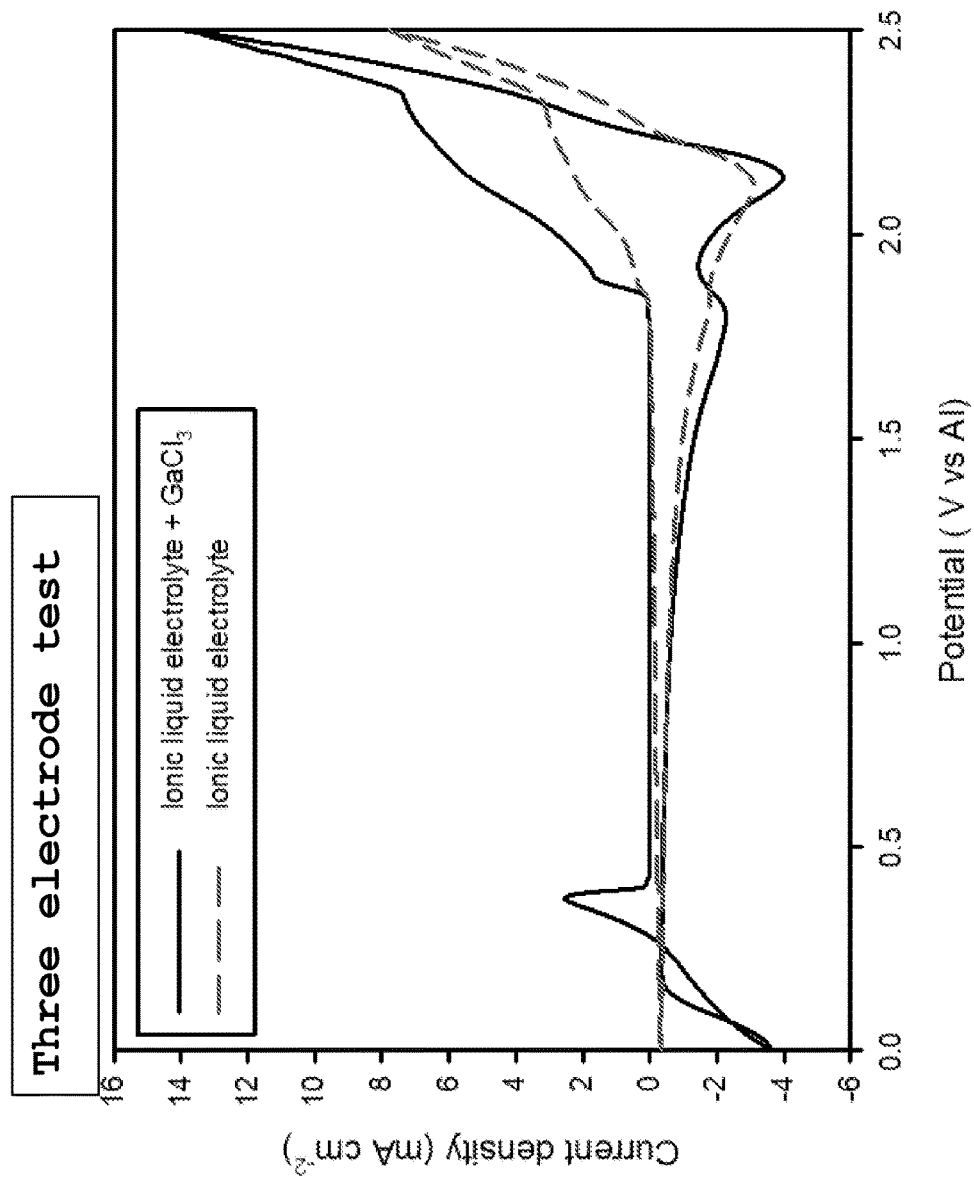
FIG. 4 is a CV plot of a three electrode test showing influence on a pyrolytic graphite working electrode when the electrolyte contains or does not contain Gallium Trichloride ($GaCl_3$) as an additive-.
Figure 5:
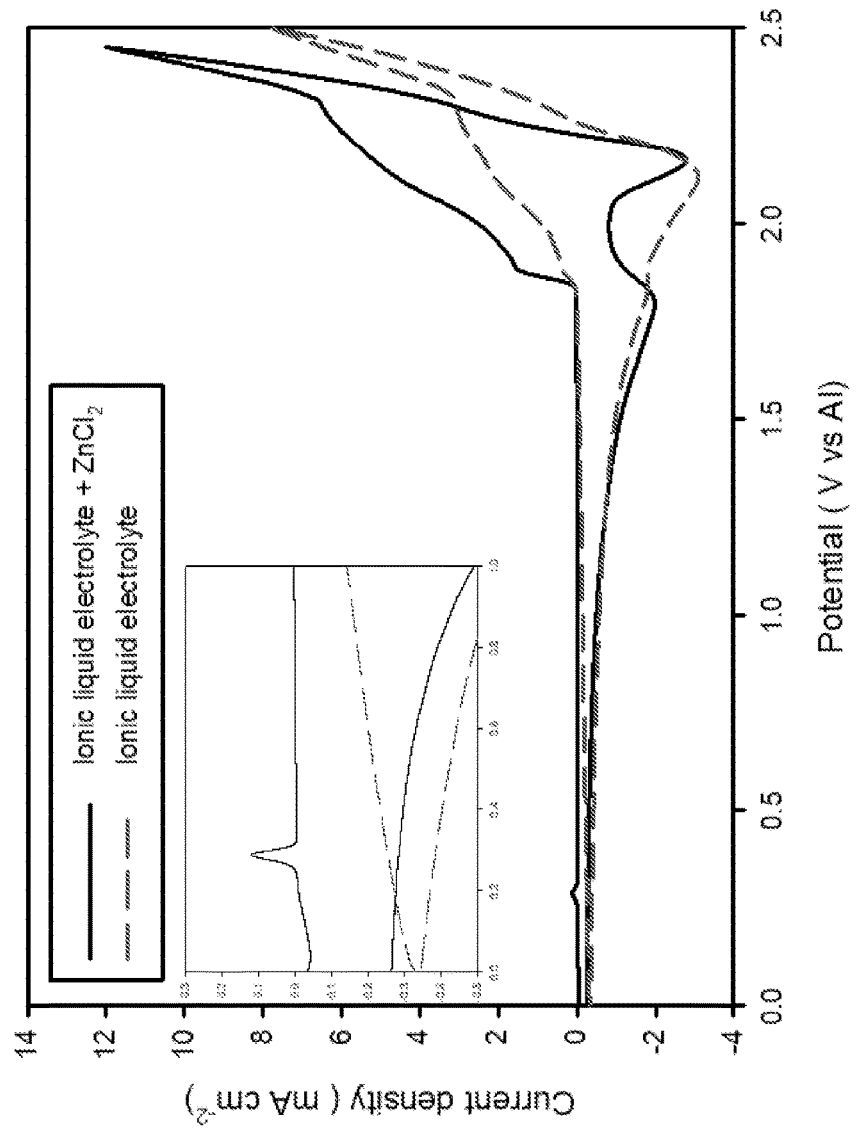
FIG. 5 is a CV plot of a three electrode test showing influence on a pyrolytic graphite working electrode when the electrolyte contains or does not contain Zinc Chloride ($ZnCl_2$) as an additive.

Al/graphite battery redox reactions during charging and discharging can be written as:

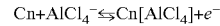   At the cathode:

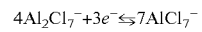   At the anode:

Referring to FIGS. 3 to 5, other additive metal halogen for example $BiCl_3$, $GaCl_3$ and $ZnCl_2$ may be used in replacement of $SnCl_2$.

Referring to FIG. 3, a three electrodes test Cycle Voltammetry (CV) plot is showed. The data of Cycle Voltammetry (CV) measurements is taken using Autolab PGSTAT 30 in a three electrode test system. It includes a pyrolytic graphite foil as a working electrode. The reference electrode and the counter electrode are aluminum foil. All of the electrodes were placed in a glass bottle with ionic liquid having a molar ratio $AlCl_3/EMIC=1.3$ in the glove box and sealed with a screw cap. Different curves are used to represent the measurements taken when the ionic liquid is with 1000 ppm of $BiCl_3$ introduced as an additive and when the ionic liquid is without $BiCl_3$. The scan rate is 10 mV/s.

The electrolyte mixture comprises $AlCl_3$ as the main metal halogen. $BiCl_3$ is introduced as a support metal halogen. The amount of $BiCl_3$ in the electrolyte should be in the range of 1000 ppm to 10000 ppm.

As shown in FIG. 3, intercalation of $BiCl_3$ ion actually occurs at 0.9V while deintercalation of $BiCl_3$ ion occurs at 0.6V. Intercalation of the ion of support metal halogen $BiCl_3$ occurs before the main metal halogen intercalation. The voltage at the cathode is maintained at 1.3V for 1-60 min to allow sufficient time for pre-intercalation to occur at cathode. Once completed, the voltage at the cathode is adjusted to an operational voltage at around 1.5V to 2.45V. The de-intercalation of the support metal halogen ion at this stage is unlikely as the normal operational voltage at the cathode will not go as low as below 0.6V to result in de-intercalation.

The use of $BiCl_3$ is relatively less desirable when compared to $SnCl_2$ as the pre-intercalation voltage of $BiCl_3$ is very close to the intercalation voltage of the ion of the main metal halogen ion $AlCl_3$. The overall stability of the system is lower comparing to that of $SnCl_2/AlCl_3$.

Referring to FIG. 4, a three electrode test is performed. The pyrolytic graphite foil as a working electrode. The reference electrode and the counter electrode are aluminum foil. All of the electrodes were placed in a glass bottle with ionic liquid having a molar ratio $AlCl_3/EMIC=1.3$ in the glove box and sealed with a screw cap. Different curves are used to represent the measurements taken when the ionic liquid is with 5000 ppm of $GaCl_3$ introduced as an additive and when the ionic liquid is without $GaCl_3$. The scan rate is 10 mV/s.

The electrolyte mixture comprises $AlCl_3$ as the main metal halogen. $GaCl_3$ is introduced as a support metal halogen. The amount of $GaCl_3$ in the electrolyte should be in the range of 5000 ppm to 10000 ppm.

As shown in FIG. 4, intercalation of $GaCl_3$ ion actually occurs at 0.4V while deintercalation of $GaCl_3$ ion occurs at 0.2V. Intercalation of the ion of support metal halogen $GaCl_3$ occurs before the main metal halogen intercalation. The voltage at the cathode is maintained at 0.5V for 1-60 min to allow sufficient time for pre-intercalation to occur at cathode. Once completed, the voltage at the cathode is adjusted to an operational voltage which is around 1.0V to 2.45V. The de-intercalation of the support metal halogen ion at this stage is unlikely as the normal operational voltage at the cathode will not go as low as below 0.2V to result in de-intercalation.

The arrangement in relation to FIG. 4 is desired as the pre-intercalation voltage of $GaCl_3$ ion is more than 1V from that of the intercalation voltage of the ion of the main metal halogen $AlCl_4^-$. The use of $GaCl_3$ is generally preferred except for its price which is higher than $SnCl_2$.

Referring to FIG. 5, a three electrode test is performed. The pyrolytic graphite foil is used as a working electrode. The reference electrode and the counter electrode are aluminum foil. All of the electrodes were placed in a glass bottle with ionic liquid having a molar ratio $AlCl_3$/EMIC=1.3 in the glove box and sealed with a screw cap. Different curves are used to represent the measurements taken when the ionic liquid is with 100 ppm of $ZnCl_2$ introduced as an additive and when the ionic liquid is without $ZnCl_2$. The scan rate of the three electrode test is 10 mV/s.

The electrolyte mixture comprises $AlCl_3$ as the main metal halogen. $ZnCl_2$ is introduced as a support metal halogen. The amount of $ZnCl_2$ in the electrolyte should be in the range of 100 ppm to 5000 ppm.

With reference to FIG. 5, intercalation of $ZnCl_2$ ion actually occurs at 0.3V while deintercalation of $ZnCl_2$ ion occurs at 0.2V. Intercalation of the ion of support metal halogen $ZnCl_2$ occurs before the main metal halogen intercalation. The voltage at the cathode is maintained at 0.5V for 1-60 min to allow sufficient time for pre-intercalation to occur at cathode. Once completed, the voltage at the cathode is adjusted to an operational voltage which is 1.0V to 2.45V. The de-intercalation of the support metal halogen ion at this stage is unlikely as the normal operational voltage at the cathode will not go as low as below 0.2V to result in de-intercalation.

With reference to FIG. 6, when considering the desirability of a metal halogen for use as a support metal halogen, balance between at least three criteria is required, including the solubility of the metal halogen, the intercalation voltage of the metal halogen ion and the possibility of undesirable side reaction. Industrially, we also take into account the price of the metal halogen.

The use of $ZnCl_2$ is less desired when compared to other metal halogen as listed in FIG. 6 despite that there is no undesirable side reaction during charging and discharging of the battery and the intercalation voltage of $ZnCl_2$ is at least is sufficiently different from that of the intercalation voltage of ions of the main metal halogen which is $AlCl_3$ in the embodiment. The pre-intercalation of $ZnCl_2$ is less effective when compared to $SnCl_2$ as well as $GaCl_3$ and as a result, there is a rather low current density at 0.3V in FIG. 5. This is because the solubility of $ZnCl_2$ in the electrolyte is relatively low at 5000 ppm.

$BiCl_3$ is the least preferred amongst the four listed in the table of FIG. 6 for acting as the support metal halogen despite its good solubility of 50000 ppm. This is because the pre-intercalation voltage of ions of $BiCl_3$ (0.8-1.0V) is relatively close to the intercalation voltage of the main metal halogen ($AlCl_3$) in the embodiment which starts at 1.3V. There is a difference of about 0.3V to 0.5V. In that case, during intercalation of $AlCl_4^-$, pre-intercalation of $BiCl_3$ may occur resulting in undesirable side reaction during charging and discharging of the battery. Moreover, $BiCl_3$ is relatively expensive.

By comparison, $SnCl_2$ is the most preferred support metal halogen for pre-intercalation when used in the $AlCl_3$/EMIC electrolyte. With reference to FIG. 2 and FIG. 6, the pre-intercalation voltage of ions of $SnCl_2$ is about 0.5-0.6V. The difference between the pre-intercalation voltage of ions of $SnCl_2$ and the intercalation voltage of ions of the main metal halogen which is $AlCl_3$ in the embodiment is more than 1V. Furthermore, there is no side reaction during charging and discharging of the battery and the solubility of $SnCl_2$ is at 500 ppm, which is a reasonable solubility for the purpose of pre-intercalation at reasonable cost.

$GaCl_3$ is an acceptable alternative with a pre-intercalation voltage of less than 0.5V (around 0.3V) which is far from the intercalation voltage of ions of the main metal halogen which is $AlCl_3$ in the embodiment. It has good solubility of about 50000 ppm and without side reaction during charging and discharging of the battery. However it is relatively expansive to use.

The minimum preferred difference of the pre-intercalation voltage of the ion of the support metal halogen and the intercalation voltage of the ion of the main metal halogen should be at least 0.5V. In general, the greater the difference the better.

A draw back of the battery discussed above is the cost involved in using molybdenum foil as the current collector in the cathode.

In general, the cathode of the battery comprises a cathode (active) material applied to or supported on a current collector. The preferred current collector includes molybdenum and tantalum. The advantage of such materials is that there will be no or minimal side effect but the cost of using these materials is high.

Nickel is a possible substitute of Molybdenum and Tantalum but the undesirable side effect involved limits its application as a base material for cathode. More specifically, Nickel reacts with the $AlCl_4^-$ ions in the electrolyte and corrodes. That said, Nickel is still considered a suitable substitute of Molybdenum and Tantalum because its resistivity is comparable to that of Molybdenum and closer to Tantalum than Molybdenum but the price is lowest amongst the three. Nickel has a resistivity (nΩ·m) of 69.3 nΩ·m and a general price of USD14,840 per ton, while Molybdenum has a resistivity of 53.4 nΩ·m and a general price of USD26,000 per ton and Tantalum has a resistivity of 131 nΩ·m and a price of USD178,574 per ton.

As shown in FIGS. 7 to 15, the Nickel electrons contribute to the peaks at the range of 0.8-1.5V. This will decrease the life cycle of the battery. Current collector must be electrochemically stable when in contact with the battery component during the potential operation window of the electrode. Continuous corrosion of current collector leads to an increase of the internal resistance of the battery, which causes a decline in the capacity. Corrosion of the current collector may result in short-circuit which affects the safety of the battery.

To mitigate the side effect, additive in the form of organic solvent or rare earth metal is applied to the electrolyte. The organic solvent may include cyclic ether, alkyl amide. More specifically, it may be Tetrahydrofuran (THF) or dimethylacetamide (DMAC). The rare earth metal may be in the form of rare earth metal halogen such as $LaCl_3$ or $YCl_3$. The organic solvent or rare earth metal ion may surround the Ni ion to lower the chances of contact between the Ni ion and the ions in the electrolyte.

In each of FIGS. 7, 10, 13, and 15, two curves are shown. The curve as shown in solid line shows the current at the battery during charging and discharging and when the electrolyte contains an additive. The dotted line curve shows the current at the battery during charging and discharging when the electrolyte does not contain the additive. In summary, the peak(s) at the range of about 0.8V to 1.5V in the dotted line curve is a result of the undesirable current generated by the electron produced by the reaction between Nickel with $AlCl_4^-$ at the cathode. This peak(s) is flattened in the solid line curve when the additive is present in the electrolyte.

Figure 7:
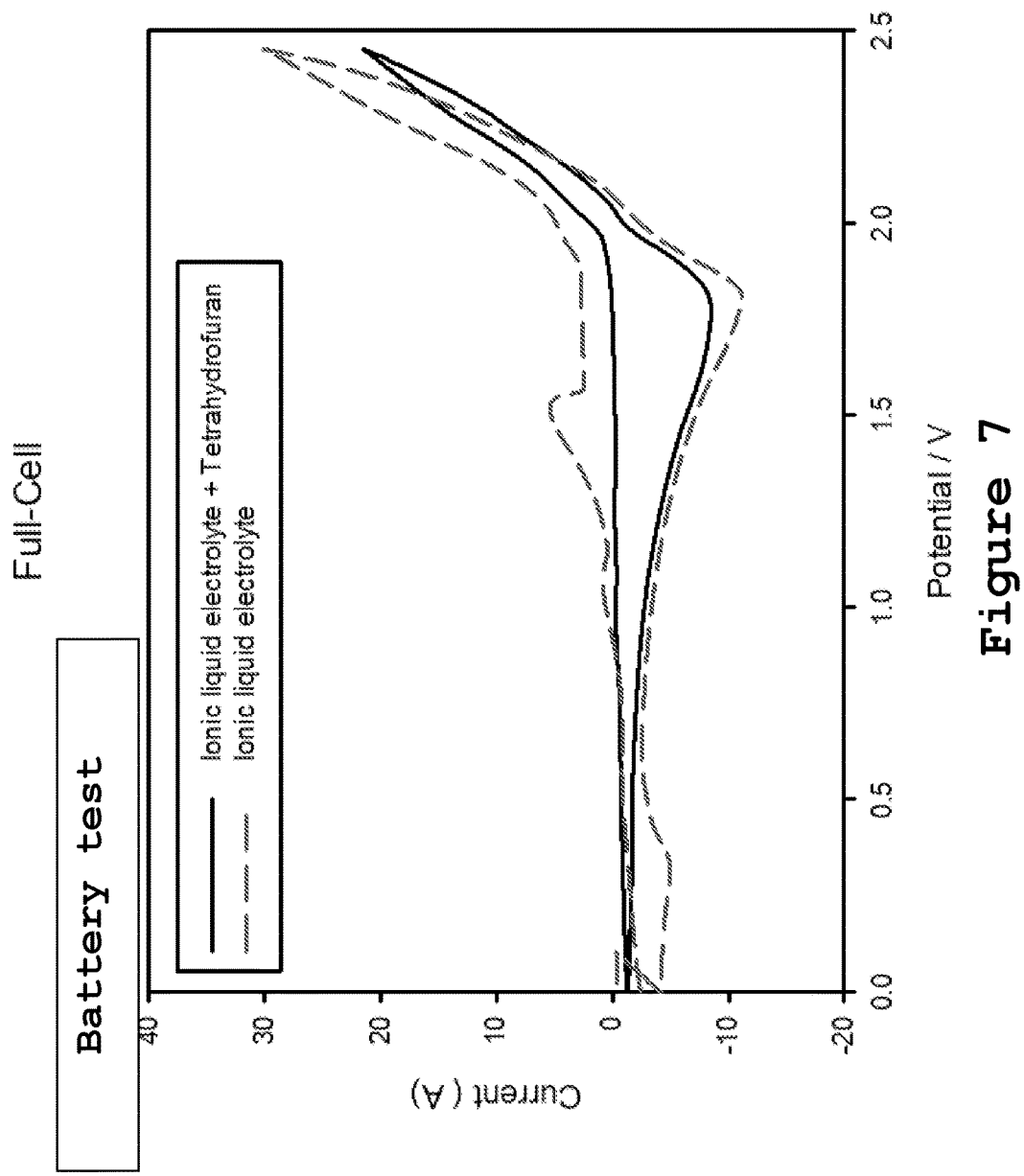
FIG. 7 is a CV plot of a battery test of a metal-ion battery with Tetrahydrofuran (THF) as an additive.
Figure 10:
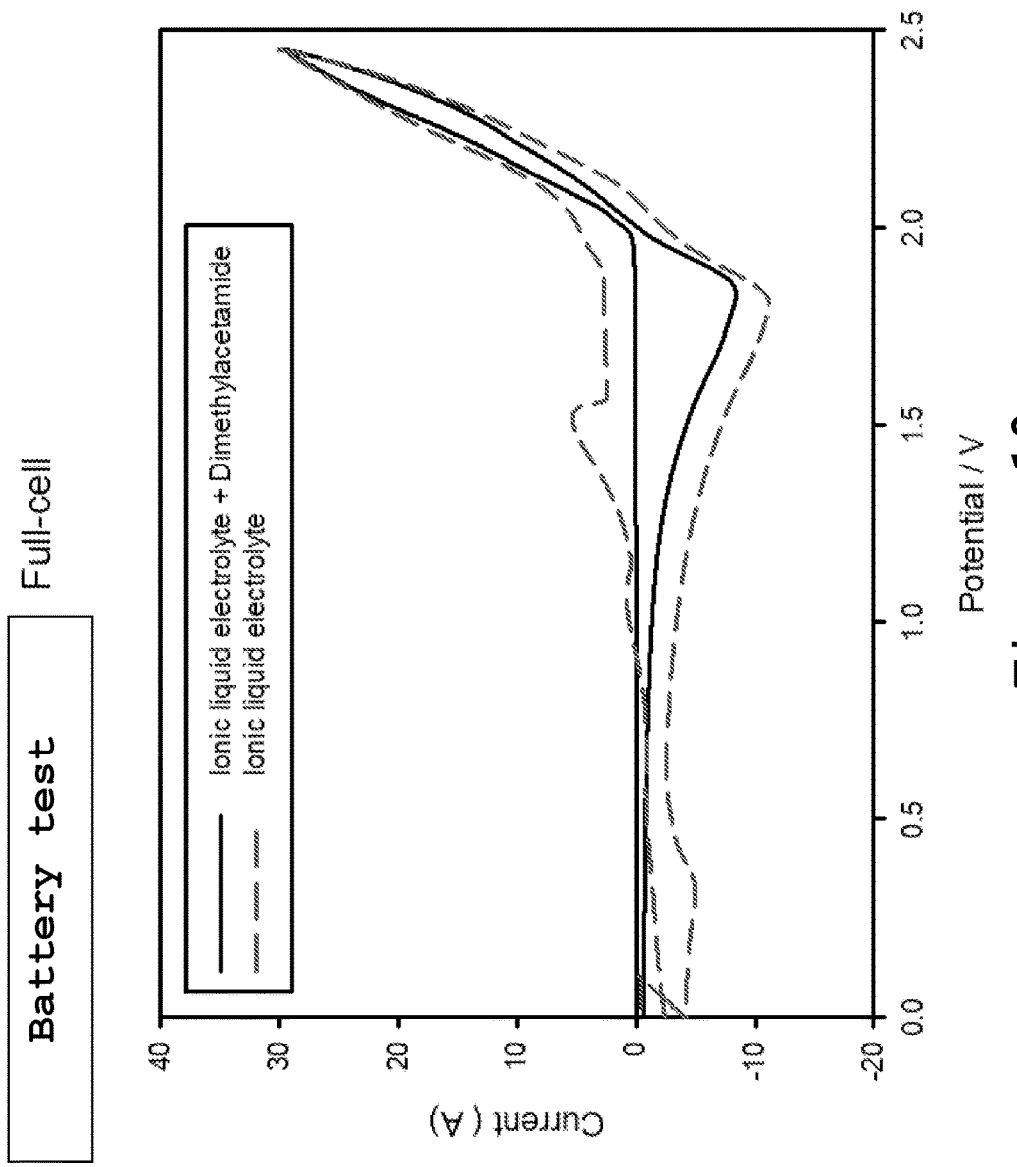
FIG. 10 is a CV plot of a battery test of a metal-ion battery with dimethylacetamide (DMAC) as an additive.
Figure 13:
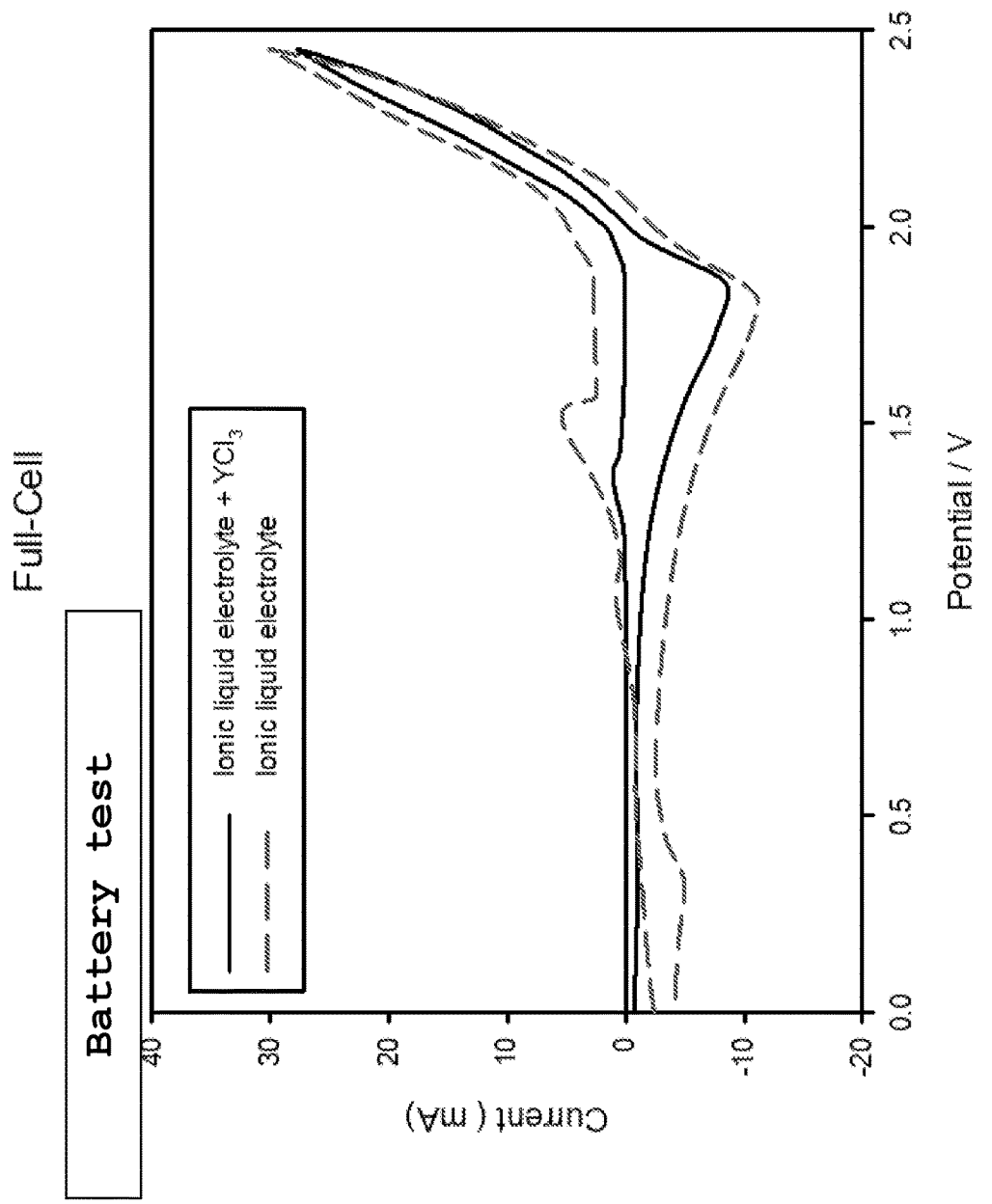
FIG. 13 is a CV plot of a battery test of a metal-ion battery with Yttrium Chloride ($YCl_3$) as an additive.
Figure 15:
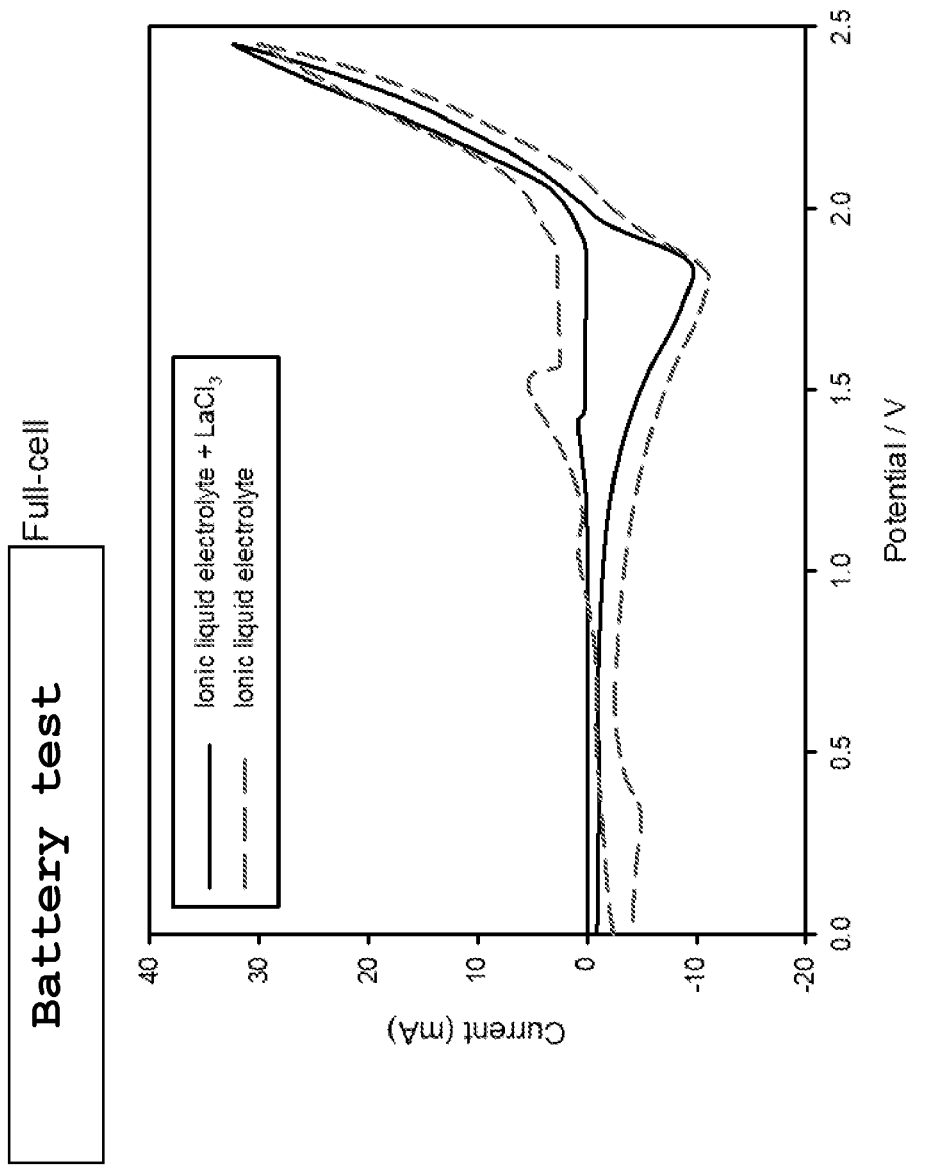
FIG. 15 is a CV plot of a battery test of a metal-ion battery with Lanthanum Chloride ($LaCl_3$) as an additive.

FIG. 7 shows the comparative result with the use of THF. FIG. 10 shows the comparative result with the use of DMAC. FIG. 13 shows the comparative result with the use of $YCl_3$. FIG. 15 shows the comparative result with the use of $LaCl_3$. In summary, the use of THF and DMAC are most preferred as the undesirable side effect in the form of current at the cathode resulting in the peaks at about 1.5V in the respective dotted line curves in FIGS. 7 and 10 are neutralized to a greater extent than the peaks at about 1.5V in the dotted line curves in FIGS. 13 and 15 when $LaCl_3$ or $YCl_3$ are used as the additive respectively.

In FIG. 7, a battery test is performed. The battery has a cathode being formed from coating a mixture comprising graphite, PTFE, VGCF coating on a nickel foam base material. The anode comprises aluminum foil. The separator is formed from glass fiber. The electrolyte mixture comprises $AlCl_3$ as the main metal halogen and EMIC. The mole ratio of $AlCl_3$/EMIC is 1.4. The battery is assembled inside a well-controlled argon filled glove box with the electrolyte being filled.

The current resulting from the electron produced by the reaction of Nickel with $AlCl_4^-$ at the cathode is mitigated by the presence of THF introduced as an additive into the electrolyte.

Figure 8:
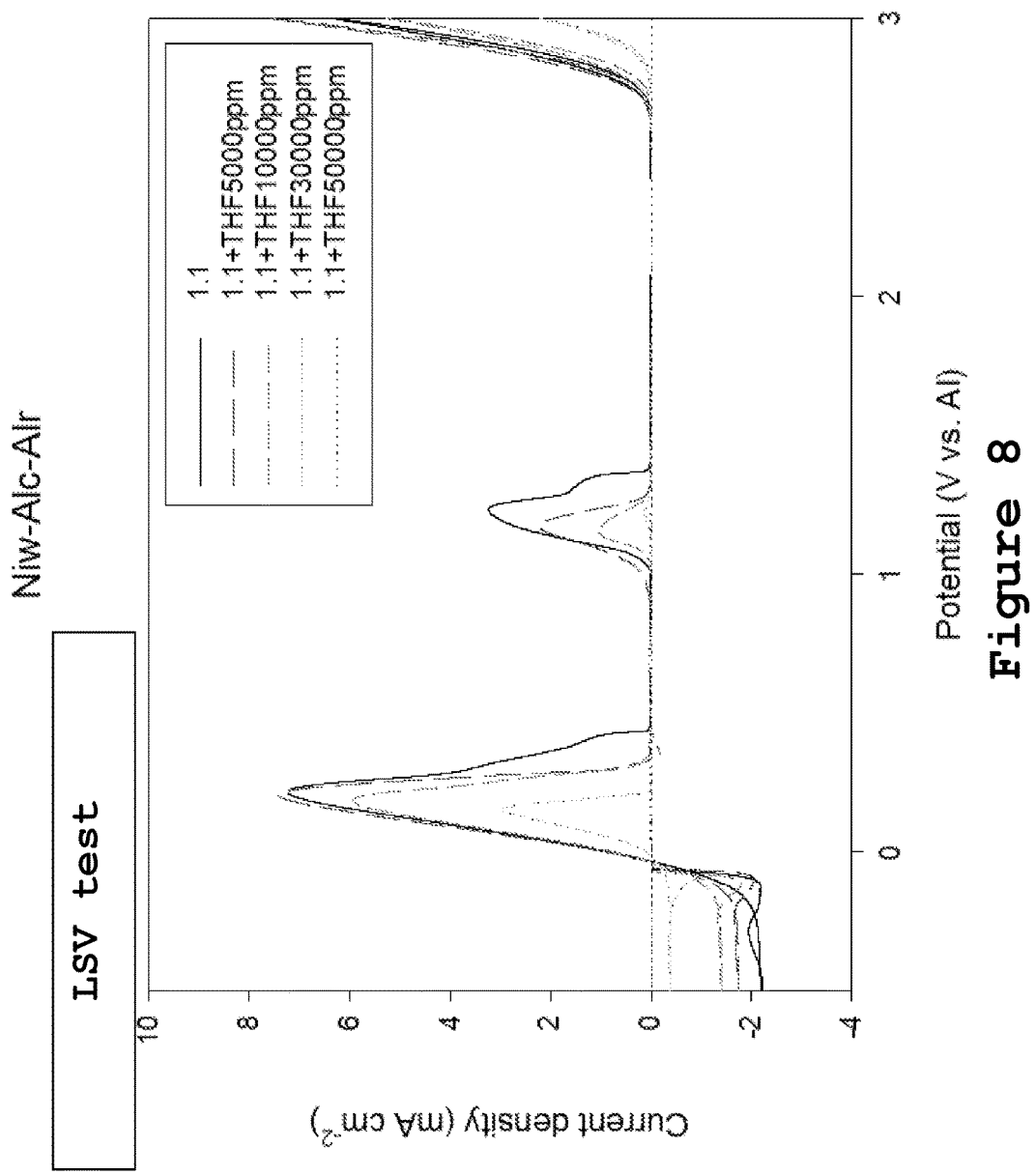
FIG. 8 is a linear sweep voltammetry (LSV) graph measuring the current at a working electrode (cathode) resulting from side effect of Ni at different concentrations of THF by sweeping linearly in time the potential between the cathode and the reference electrode at room temperature with a sweep rate of 1 mV/s, the working electrode (cathode) comprises Ni as the current collector, the reference electrode comprises Al and the electrolyte comprises a molar ratio $AlCl_3$/EMIC=1.1.

Referring to FIG. 8, there is shown the scan results of a Linear Sweep Voltammetry (LSV) test with a sweep rate of 1 mV/s. The linear sweep voltammetry (LSV) graph measures the current at the working electrode (cathode) resulted from the electrons provided by the side effect of Ni at different concentrations of THF (0 ppm, 5000 ppm, 10000 ppm, 30000 ppm and 50000 ppm) by sweeping linearly in time the potential between the cathode and the reference electrode at room temperature. The working electrode (cathode) comprises Ni as the current collector, the reference electrode comprises Al and the electrolyte comprises a molar ratio $AlCl_3$/EMIC=1.1. The current is suppressed by the presence of THF. The suppression of the current as shown in the peak at the range of 0.8-1.5V increases with the amount of THF used. In other words, the peak decreases in magnitude with the amount of THF used.

Figure 9:
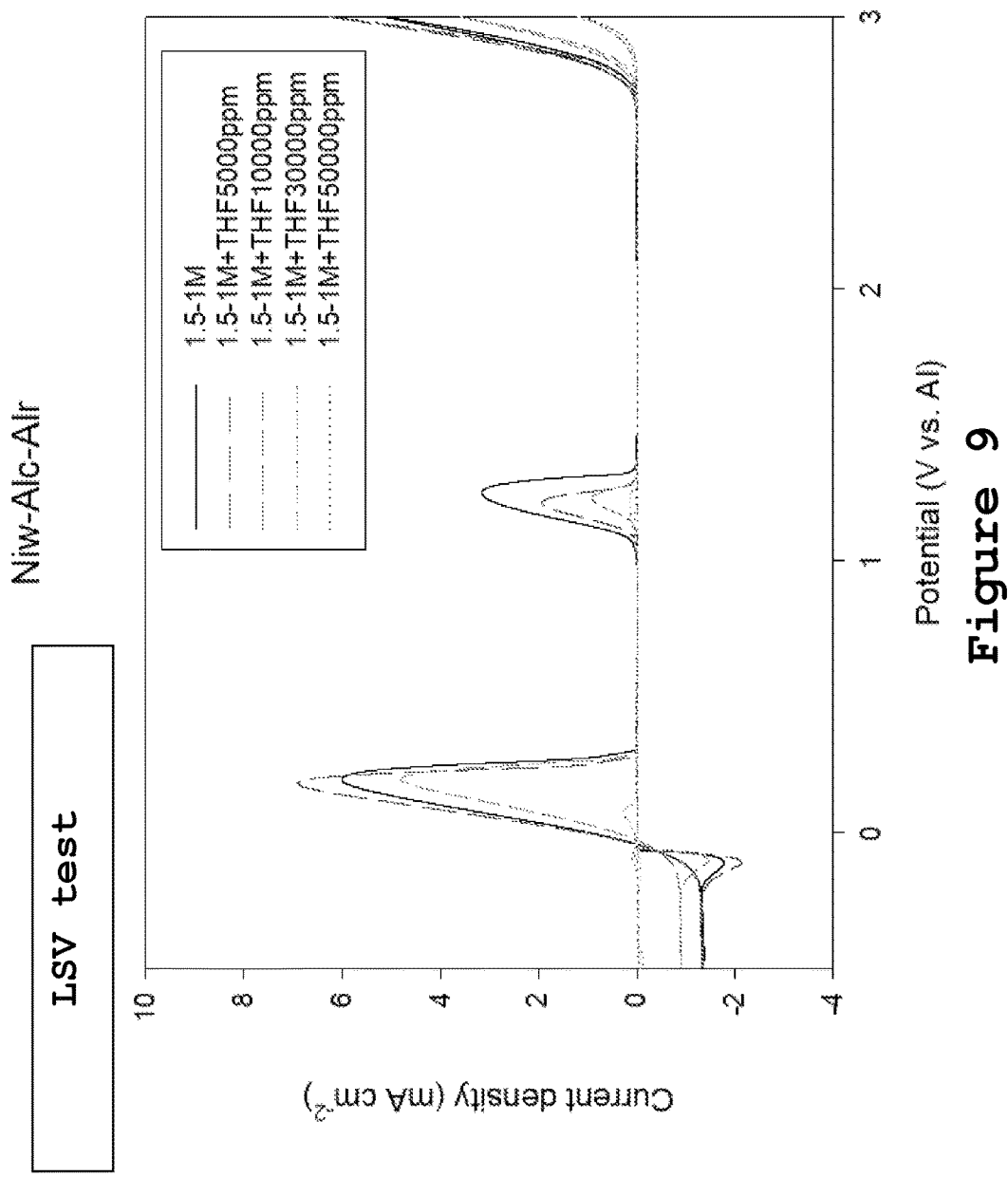
FIG. 9 is a linear sweep voltammetry graph measuring the current at a working electrode (Cathode) resulting from side effect of Ni at different concentrations of THF by sweeping linearly in time the potential between the cathode and the reference electrode at room temperature with a sweep rate of 1 mV/s, the working electrode (cathode) comprises Ni as the current collector, the reference electrode comprises Al and the electrolyte comprises a molar ratio $AlCl_3/EMIC=1.5$ and 1M of Lithium Chloride (LiCl)

FIG. 9 shows the scan results of a Linear Sweep Voltammetry (LSV) test with a sweep rate of 1 mV/s. The linear sweep voltammetry (LSV) graph measures the current at the working electrode (cathode) resulted from the electrons provided by the side effect of Ni at different concentrations of THF (0 ppm, 5000 ppm, 10000 ppm, 30000 ppm and 50000 ppm) by sweeping linearly in time the potential between the cathode and the reference electrode at room temperature. The working electrode (cathode) comprises Ni as the current collector, the reference electrode comprises Al and the electrolyte comprises a molar ratio $AlCl_3$/EMIC=1.5 and 1M of LiCl. The current is suppressed by the presence of THF. The suppression of the current as shown in the peak at the range of 0.8-1.5V increases with the amount of THF used. In other words, the peak decreases in magnitude with the amount of THF used.

FIGS. 8 and 9 together demonstrate that the ability of THF in suppressing the undesirable current resulting from Ni at the cathode remains unchanged despite the presence of a single main metal halogen or a combination of more than one main metal halogen as the electrolyte.

As discussed above, dimethylacetamide is another possible additive that would reduce and eventually neutralize or remove the side effect resulting from the reaction between Nickel and the $AlCl_4^-$.

Referring to FIG. 10, a battery test is performed on a battery with a cathode formed by coating a mixture of graphite, PTFE, VGCF coating on a nickel foam base material. The negative electrode is aluminum foil. The separator is a glass fiber. The electrolyte mixture comprises $AlCl_3$, the main metal halogen, and EMIC. The mole ratio of $AlCl_3$/EMIC is 1.4. The battery is assembled inside a well-controlled argon filled glove box with the electrolyte being filled.

5000 ppm of dimethylacetamide is added to the electrolyte to suppress the side effect resulting from the reaction between Nickel and the $AlCl_4^-$. The peaks at about 0.8-1.5V in FIG. 10 is flattened when dimethylacetamide is added.

Figure 11:
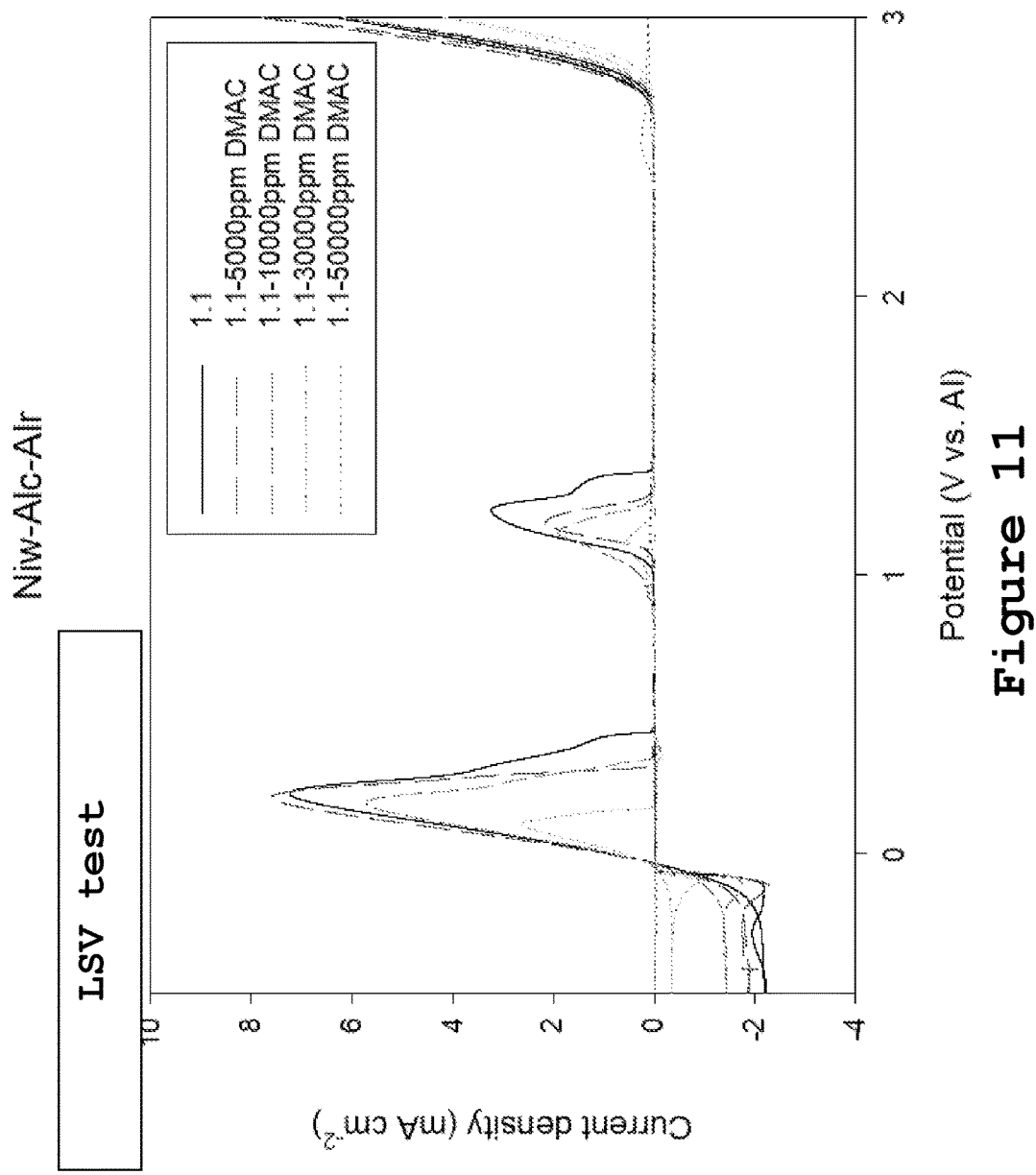
FIG. 11 is a linear sweep voltammetry (LSV) graph measuring the current at a working electrode (cathode) resulting from side effect of Ni at different concentrations of DMAC by sweeping linearly in time the potential between the cathode and the reference electrode at room temperature with a sweep rate of 1 mV/s, the working electrode (cathode) comprises Ni as the current collector, the reference electrode comprises Al and the electrolyte comprises a molar ratio $AlCl_3/EMIC=1.1$.

Referring to FIG. 11, there is shown the scan results of a Linear Sweep Voltammetry (LSV) test with a sweep rate of 1 mV/s. The linear sweep voltammetry (LSV) graph measures the current at the working electrode (cathode) resulted from the electrons provided by the side effect of Ni at different concentrations of DMAC (0 ppm, 5000 ppm, 10000 ppm, 30000 ppm and 50000 ppm) by sweeping linearly in time the potential between the cathode and the reference electrode at room temperature. The working electrode (cathode) comprises Ni as the current collector, the reference electrode comprises Al and the electrolyte comprises a molar ratio $AlCl_3$/EMIC=1.1. The current is suppressed by the presence of DMAC. The suppression of the current as shown in the peak at the range of 0.8-1.5V increases with the amount of DMAC used. In other words, the peak decreases in magnitude with the amount of DMAC used. There is a substantially linear relationship between the suppression and the amount of DMAC within the range of 0-50000 ppm.

Figure 12:
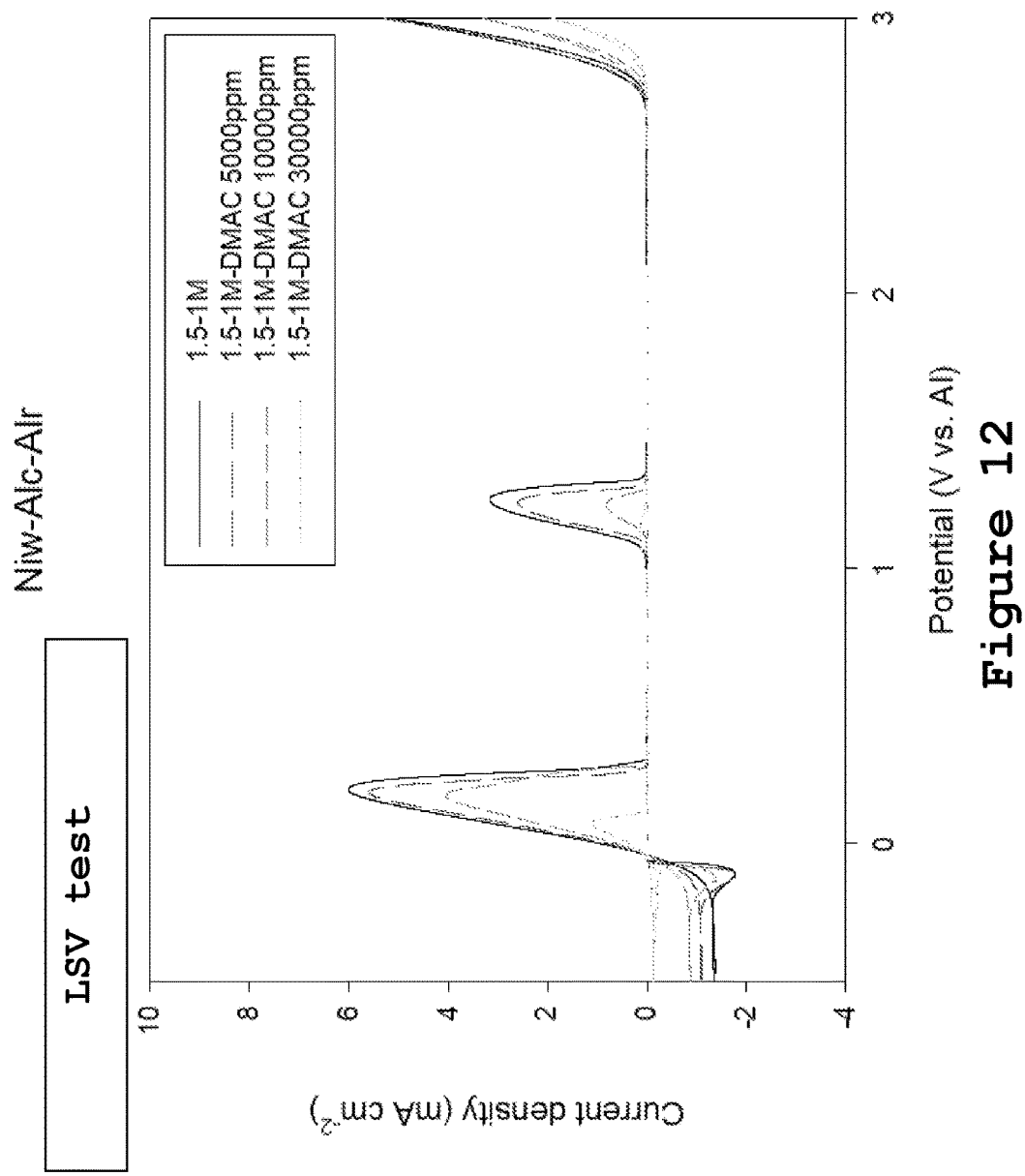
FIG. 12 is a linear sweep voltammetry graph measuring the current at a working electrode (Cathode) resulting from side effect of Ni at different concentrations of DMAC by sweeping linearly in time the potential between the cathode and the reference electrode at room temperature with a sweep rate of 1 mV/s, the working electrode (cathode) comprises Ni as the current collector, the reference electrode comprises Al and the electrolyte comprises a molar ratio $AlCl_3/EMIC=1.5$ and 1M of Lithium Chloride (LiCl)

FIG. 12 shows the scan results of a Linear Sweep Voltammetry (LSV) test with a sweep rate of 1 mV/s. The linear sweep voltammetry (LSV) graph measures the current at the working electrode (cathode) resulted from the electrons provided by the side effect of Ni at different concentrations of DMAC (0 ppm, 5000 ppm, 10000 ppm, and 30000 ppm) by sweeping linearly in time the potential between the cathode and the reference electrode at room temperature. The working electrode (cathode) comprises Ni as the current collector, the reference electrode comprises Al and the electrolyte comprises a molar ratio $AlCl_3$/EMIC=1.5 and 1M of LiCl. The current is suppressed by the presence of DMAC. The suppression of the current as shown in the peak at the range of 0.8-1.5V increases with the amount of DMAC used. In other words, the peak decreases in magnitude with the amount of DMAC used.

FIGS. 11 and 12 together demonstrate that the ability of DMAC in suppressing the undesirable current resulting from Ni at the cathode remains unchanged despite the presence of a single main metal halogen or a combination of more than one main metal halogen as the electrolyte.

Referring to FIG. 13, a battery test is performed on a battery with a cathode formed by coating a mixture of graphite, PTFE, VGCF coating on a nickel foam base material. The negative electrode is aluminum foil. The separator is a glass fiber. The electrolyte mixture comprises $AlCl_3$, the main metal halogen, and EMIC. The mole ratio of $AlCl_3$/EMIC is 1.4.

The battery is assembled inside a well-controlled argon filled glove box with the electrolyte being filled.

500 ppm of $YCl_3$ is added to the electrolyte to suppress the side effect resulting from the reaction between Nickel and the $AlCl_4^-$ The peaks at 0.8V-1.5V are substantially reduced after the addition of $YCl_3$.

Intercalation and de-intercalation of $YCl_3$ do not occur during the operational voltage of the battery.

Figure 14:
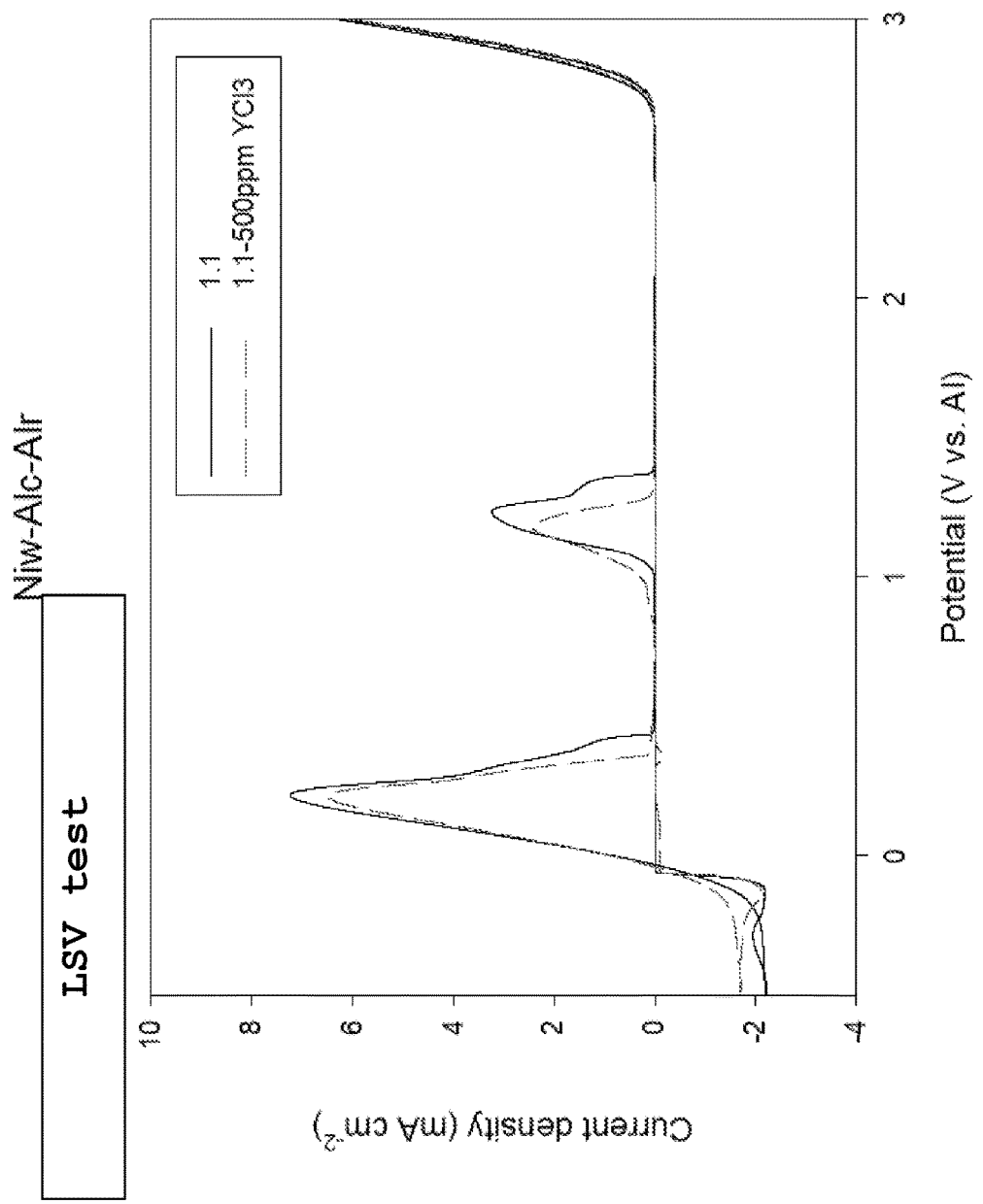
FIG. 14 is a linear sweep voltammetry (LSV) graph measuring the current at a working electrode (cathode) resulting from side effect of Ni at different concentrations of $YCl_3$ by sweeping linearly in time the potential between the cathode and the reference electrode at room temperature with a sweep rate of 1 mV/s, the working electrode (cathode) comprises Ni as the current collector, the reference electrode comprises Al and the electrolyte comprises a molar ratio $AlCl_3/EMIC=1.1$.

Referring to FIG. 14, there is shown the scan results of a Linear Sweep Voltammetry (LSV) test with a sweep rate of 1 mV/s. The linear sweep voltammetry (LSV) graph measures the current at the working electrode (cathode) resulted from the electrons provided by the side effect of Ni at different concentrations of $YCl_3$ (0 ppm and 500 ppm) by sweeping linearly in time the potential between the cathode and the reference electrode at room temperature. The working electrode (cathode) comprises Ni as the current collector, the reference electrode comprises Al and the electrolyte comprises a molar ratio $AlCl_3$/EMIC=1.1. The current is suppressed by the presence of $YCl_3$.

Referring to FIG. 15, a battery test is performed on a battery with a cathode formed by coating a mixture of graphite, PTFE, VGCF coating on a nickel foam base material. The negative electrode is aluminum foil. The separator is a glass fiber. The electrolyte mixture comprises $AlCl_3$, the main metal halogen, and EMIC. The mole ratio of $AlCl_3$/EMIC is 1.4.

The battery is assembled inside a well-controlled argon filled glove box with the electrolyte being filled.

500 ppm of $LaCl_3$ is added to the electrolyte to suppress the side effect resulting from the reaction between Nickel and the $AlCl_4^-$ The peaks at 0.8V-1.5V are substantially reduced after the addition of $LaCl_3$.

Intercalation and de-intercalation of $LaCl_3$ do not occur during the operational voltage of the battery.

Figure 16:
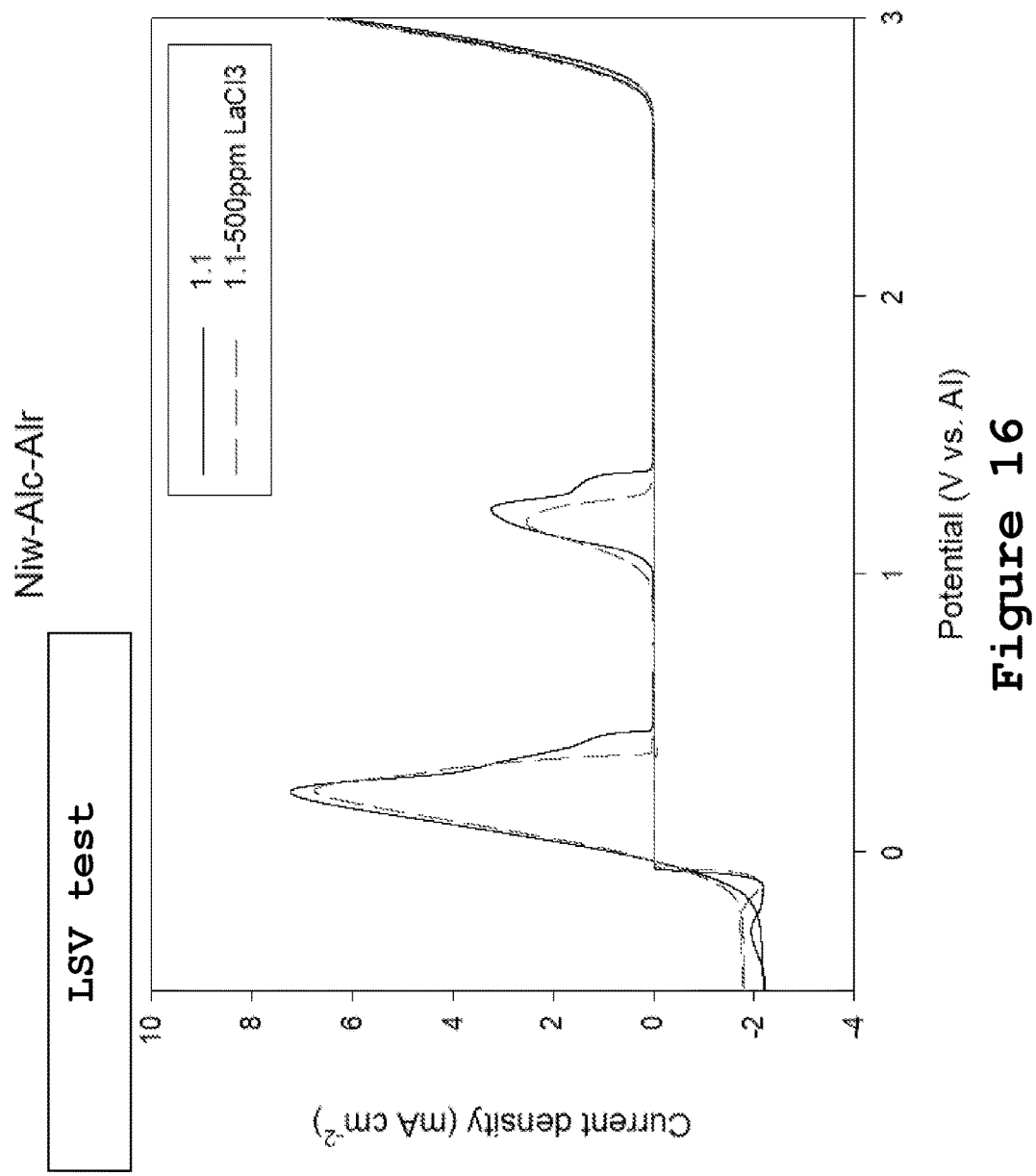
FIG. 16 is a linear sweep voltammetry (LSV) graph measuring the current at a working electrode (cathode) resulting from side effect of Ni at different concentrations of $LaCl_3$ by sweeping linearly in time the potential between the cathode and the reference electrode at room temperature with a sweep rate of 1 mV/s, the working electrode (cathode) comprises Ni as the current collector, the reference electrode comprises Al and the electrolyte comprises a molar ratio $AlCl_3/EMIC=1.1$.

Referring to FIG. 16, there is shown the scan results of a Linear Sweep Voltammetry (LSV) test with a sweep rate of 1 mV/s. The linear sweep voltammetry (LSV) graph measures the current at the working electrode (cathode) resulted from the electrons provided by the side effect of Ni at different concentrations of $LaCl_3$ (0 ppm and 500 ppm) by sweeping linearly in time the potential between the cathode and the reference electrode at room temperature. The working electrode (cathode) comprises Ni as the current collector, the reference electrode comprises Al and the electrolyte comprises a molar ratio $AlCl_3$/EMIC=1.1. The current is suppressed by the presence of $LaCl_3$.

As shown in FIG. 17, the amount of THF introduced into the electrolyte is at least 600 ppm to result in a noticeable suppression of the side effect of the Nickel base. The optimum range is around 2000 ppm-5000 ppm and the optimum amount would be 3000 ppm. Suppression of side effect is not possible when the amount of THF is below 500 ppm. However if too much of THF is added into the electrolyte, charging and discharging of the battery becomes adversely affected. Any amount more than 50000 ppm would hinder the charging and discharging of the battery.

As shown in FIG. 17, the amount of dimethylacetamide introduced into the electrolyte is at least 1000 ppm to result in a noticeable suppression of the side effect of the Nickel base. The optimum range is around 4000 ppm-6000 ppm and the optimum amount would be 5000 ppm. Suppression of side effect is not possible when the amount of dimethylacetamide is below 1000 ppm. However if too much of dimethylacetamide is added into the electrolyte, charging and discharging of the battery becomes adversely affected. Any amount more than 50000 ppm would hinder the charging and discharging of the battery.

As shown in FIG. 17, the amount of $YCl_3$ introduced into the electrolyte is less than 5000 ppm and the optimal amount is 500 ppm for suppressing the side effect of the Nickel base. Suppression of side effect is not possible when the amount of $YCl_3$ is below 50 ppm. However if too much of $YCl_3$ is added into the electrolyte, charging and discharging of the battery becomes adversely affected. Any amount more than 5000 ppm would hinder the charging and discharging of the battery.

As shown in FIG. 17, the amount of $LaCl_3$ introduced into the electrolyte is less than 5000 ppm and the optimal amount is 500 ppm for suppressing the side effect of the Nickel base. Suppression of side effect is not possible when the amount of $LaCl_3$ is below 50 ppm. However if too much of $LaCl_3$ is added into the electrolyte, charging and discharging of the battery becomes adversely affected. Any amount more than 5000 ppm would hinder the charging and discharging of the battery.

The invention has been given by way of example only, and various other modifications of and/or alterations to the described embodiment may be made by persons skilled in the art without departing from the scope of the invention as specified in the appended claims.

The invention claimed is:

1. An ionic liquid metal-ion energy storage system comprising:
    a positive electrode;
    a negative electrode comprising aluminum;
    an ionic liquid electrolyte in electrical contact with the positive electrode and the negative electrode; and
    a separator in contact with the ionic liquid electrolyte and located between the positive electrode and the negative electrode, wherein
        the ionic liquid electrolyte is a mixture including an imidazole salt, a main metal halogen compound comprising $AlCl_3$, and an additive,
        the main metal halogen compound has an intercalation voltage and the additive comprises at least one support metal halogen compound having an intercalation voltage smaller than the intercalation voltage of the main metal halogen compound, and
        the support metal halogen compound is selected from the group consisting of $BiCl_3$ and $GaCl_3$.

2. The ionic liquid metal-ion energy storage system as claimed in claim 1, wherein the positive electrode comprises a current collector and at least one active material.

3. The ionic liquid metal-ion energy storage system as claimed in claim 2, wherein the active material is selected from the group consisting of graphite, Mxene, $LiFePO_4$, $LiMnO_2$, $LiMn_2O_4$, $Li_3V_2(PO_4)_3$, and $Na_3V_2(PO_4)_3$.

4. The ionic liquid metal-ion energy storage system as claimed in claim 1, wherein the separator is a porous membrane selected from the group consisting of polytetrafluoroethylene (PTFE), polyacrylonitrile (PAN), glass fiber, and polyimide (PI).

5. The ionic liquid metal-ion energy storage system as claimed in claim 1, wherein the main metal halogen compound is a combination of $AlCl_3$ and a metal halogen compound selected from the group consisting of LiCl, NaCl, and $MgCl_2$.

6. The ionic liquid metal-ion energy storage system as claimed in claim 1, wherein
the imidazole salt comprises 1-methyl-3-ethylimidazolium chloride (EMIC), and
the molar ratio of $AlCl_3$/EMIC is in a range from 1.1 to 2.2.

7. The ionic liquid metal-ion energy storage system as claimed in claim 1, wherein the additive has a concentration in the ionic liquid electrolyte of no more than 10000 ppm.

8. The ionic liquid metal-ion energy storage system as claimed in claim 1, wherein
the additive is $BiCl_3$, and
the operating voltage of the ionic liquid metal-ion energy storage system is in a range from 1.5 volts to 2.45 volts.

9. The ionic liquid metal-ion energy storage system as claimed in claim 1, wherein
the additive is $GaCl_3$, and
the operating voltage of the ionic liquid metal-ion energy storage system is in a range from 1.0 volts to 2.45 volts.

\* \* \* \* \*